(12) United States Patent
Heermann et al.

(10) Patent No.: US 8,279,425 B1
(45) Date of Patent: Oct. 2, 2012

(54) FREQUENCY DOMAIN REFLECTOMETRY (FDR) LETHALITY ASSESSMENT METHOD AND SYSTEM FOR DETERMINING IMPACT POINT AND DAMAGE PROPAGATION IN DETECTION SURFACE

(75) Inventors: Doug Heermann, Conroe, TX (US); Karl F. Kiefer, Conroe, TX (US)

(73) Assignee: Invocon, Inc., Conroe, TX (US)

( * ) Notice: Subject to any disclaimer, the term of this patent is extended or adjusted under 35 U.S.C. 154(b) by 558 days.

(21) Appl. No.: 12/383,062

(22) Filed: Mar. 18, 2009

Related U.S. Application Data

(60) Provisional application No. 61/037,704, filed on Mar. 18, 2008.

(51) Int. Cl.
*G01N 21/00* (2006.01)
(52) U.S. Cl. ............... 356/73.1; 324/534; 398/9
(58) Field of Classification Search .......... 356/73.1; 398/9–24
See application file for complete search history.

(56) References Cited

U.S. PATENT DOCUMENTS

| | | | |
|---|---|---|---|
| 6,608,489 B2 * | 8/2003 | Yankielun et al. | 324/642 |
| 7,777,496 B2 * | 8/2010 | Evans et al. | 324/534 |

* cited by examiner

*Primary Examiner* — Tara S Pajoohi Gomez
(74) *Attorney, Agent, or Firm* — Kenneth A. Roddy

(57) ABSTRACT

A system and method for performing lethality assessment utilizes frequency domain reflectometry (FDR) to determine impact point and damage propagation faults in a detection surface. The detection surface has a conductive layer capable of propagating radio frequency (RF) signals. At least one signal transmit/receive port on the detection surface injects a radio frequency (RF) interrogation signal into the detection surface and at least two signal receive-only ports on the detection surface spaced a distance apart from each other and from the signal transmit/receive port receive reflected radio frequency (RF) signals of the interrogation signal. A frequency domain reflectometry measurement system coupled with the transmit/receive port and signal receive-only ports measures frequency responses of the ports compared to predetermined baseline measurements and determines the precise location of an impact point and damage propagation fault in the detection surface by triangulation.

4 Claims, 4 Drawing Sheets

FREQUENCY DOMAIN REFLECTOMETRY (FDR) LETHALITY ASSESSMENT METHOD AND SYSTEM FOR DETERMINING IMPACT POINT AND DAMAGE PROPAGATION IN DETECTION SURFACE

CROSS REFERENCE TO RELATED APPLICATION

This application claims priority of U.S. Provisional Application Ser. No. 61/037,704, filed Mar. 18, 2008.

BACKGROUND OF THE INVENTION

1. Field of the Invention

This invention relates generally to methods and systems for determining the impact point and damage propagation in a detection surface, and more particularly to a method and system for performing lethality assessment that utilizes a Frequency Domain Reflectometry (FDR) technique to determine the impact point and damage propagation in a detection surface.

2. Background Art

Most lethality assessment systems and methods for lethality assessment systems for determine the impact point and damage propagation in a detection surface, such as ballistic missile intercepts, typically utilize a grid based lethality detection system in which a wire grid forms a mesh over the surface of the target missile nosecone and wire breaks within that grid are detected upon impact to provide an assessment of the impact point and subsequent damage propagation.

Frequency Domain Reflectometry (FDR) is a signal processing technique that encompasses several technical applications. The basic principle of FDR is the use of FM ranging to determine the distance to a reflective object. Examples include Frequency Modulated Continuous Wave (FMCW) RADAR and distance to fault (DTF) measurements in communications cables. DTF measurements are applicable to any cable installation that is obscured or inaccessible for manual or visual inspections or that could contain invisible faults suffered due to material aging, corrosion, or exposure. Examples of common uses are aircraft wiring harnesses and remote transceiver sites such as cellular telephone towers. Time Domain Reflectometry (TDR) is another technique used to measure cable faults. FDR is differentiated from TDR by the use of a frequency sweep as the interrogation signal rather than a high frequency impulse as used in TDR systems.

SUMMARY OF THE INVENTION

The present lethality assessment method and system differs significantly from grid based lethality detection systems in that it utilizes a "detection surface" construction rather than a wire "detection grid".

The present detection surface comprises an inner conductor in which the detection signals will propagate sandwiched between two dielectric layers. This layered assembly is encompassed by conductive ground planes which are connected at the surface edge. The material selection and thickness of the dielectric layers contribute to the frequency selectivity as well as the propagation velocity of signals in the surface.

The present method and system also utilizes a Frequency Domain Reflectometry (FDR) technique to determine the impact point and damage propagation in a detection surface, such as ballistic missile intercepts, provides significant differences and advantages over conventional grid based lethality detection systems, and provides significant size, cost, and performance improvements over the grid based systems. Table 1 below lists some of the significant differences and advantages of the present method and system compared to conventional grid based lethality detection systems.

TABLE 1

|  | Grid Based | FDR Reflectometry |
|---|---|---|
| Connector Count | High connector count (2 connections per grid wire) | Low connector count (min 2 ports, max defined by required performance and redundancy) |
| Spatial Resolution | Spatial resolution decreases at larger end of aeroshell | Uniform spatial resolution over detection surface |
| Manufacturability | Labor intensive grid wire routing | Standard electroplating and dielectric film application processes |
| Integration with Detection Electronics | Complex wire routing, shielding and verification required | Single connection per RF port |

As shown in Table 1 above, the following is a discussion of some of the significant differences and advantages of the present method and system compared to conventional grid based lethality detection systems.

Decreased Connector Count

The smallest IVC grid used to date contains 20 wires which must be connected on both ends for a total of 40 connections. The largest grid used to date contains 160 wires which must be connected on both ends for a total of 320 connections. The present FDR system potentially uses between 3-10 connections greatly reducing the connector count required.

Uniform Spatial Resolution Over Entire Detection Surface

Grid based systems are more densely spaced at the smaller "tip end" of a conical missile nosecone and less dense at the larger "aft end" of the nosecone. In contrast, the present FDR system provides a uniform spatial resolution over the entire detection surface.

Faster, More Cost Effective Manufacturing

Detection grids are time consuming and costly to build. The grid wires must be placed very precisely and the wire terminations themselves are very time consuming. The present FDR detection surface can be manufactured using standard electroplating and dielectric film application processes reducing cost and fabrication time for the detection surface.

Simplified Integration with Detection Electronics

Large numbers of wires and connections increase the size of the electronics interface and require complex wire routing and shielding when a grid and detection electronics are integrated into the missile assembly. The present FDR system has smaller detection electronics with fewer wires and connections to install and verify during the integration process.

Other features and advantages of the invention will become apparent from time to time throughout the specification and claims as hereinafter related.

DESCRIPTION OF THE PREFERRED EMBODIMENTS

Figure 1:
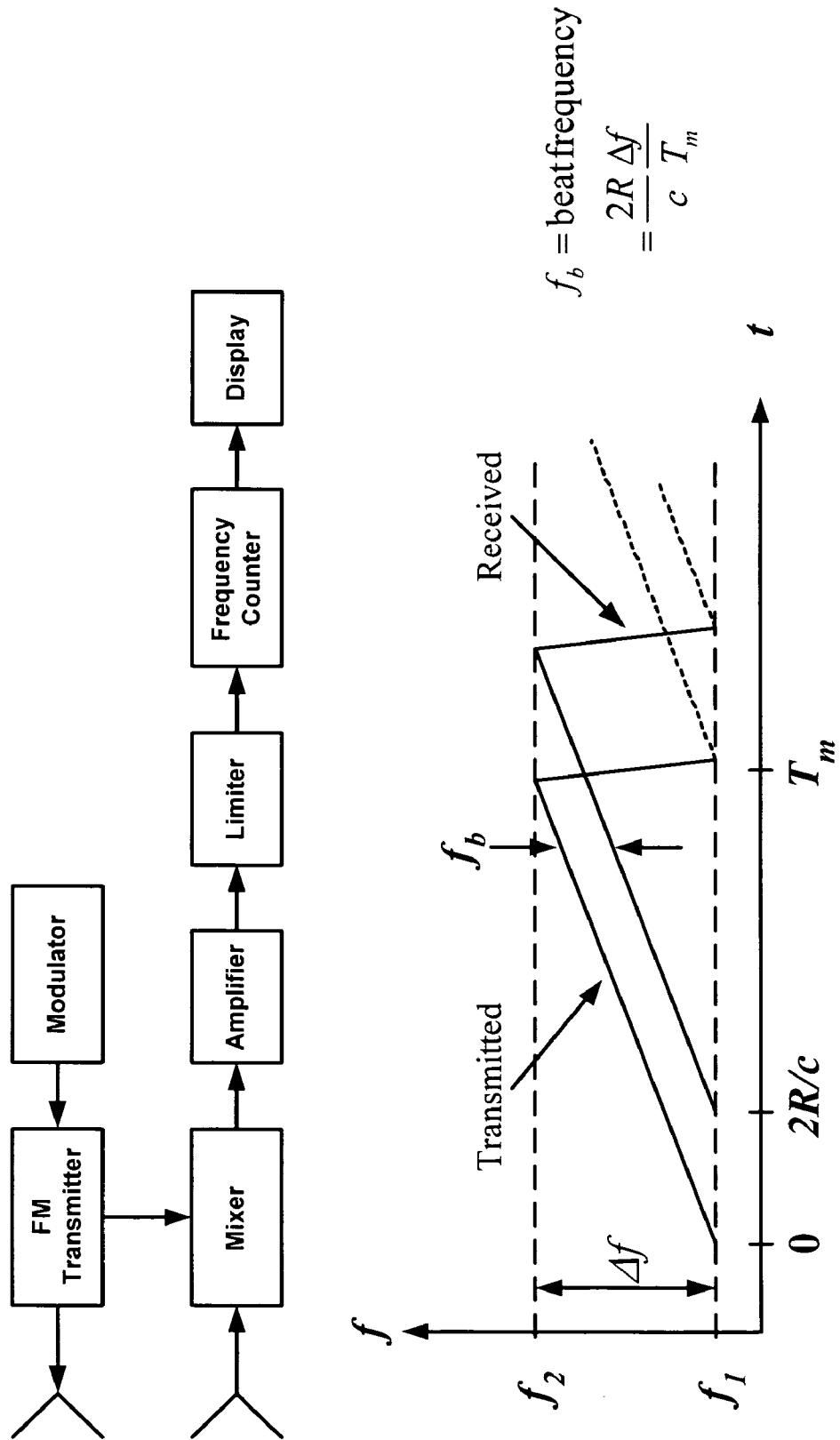
FIG. 1 is a block diagram and graph showing a simplified example of a Frequency Modulated Continuous Wave Radar (FMCW RADAR) system and the mathematical relationship developed that provides a basis that is expanded upon to apply the Frequency Domain Reflectometry (FDR) technique to the lethality assessment system and method in accordance with the present invention.

Referring to the drawings by numerals of reference, FIG. 1 is a block diagram and graph showing a simplified example of a Frequency Modulated Continuous Wave Radar (FMCW RADAR) system. The mathematical relationship developed here provides a basis that is expanded upon to apply the FDR technique to lethality assessment.

The block diagram depicts the transmission of an interrogation signal from an FM transmitter. The resultant received signal is a time delayed version of the transmitted signal. The delay between the transmitted signal and the received signal is proportional to the range that the signal has traveled (i.e. the distance to the reflective object). The magnitude of this range is measured by mixing the transmitted and received signals to create a beat frequency that is proportional to the range (R). Thus, the measurement of the resultant beat frequency is an indirect measurement of the range.

A constant beat frequency is achieved due to the nature of the constructed interrogation signal. A plot of the transmitted frequency vs. time is a linear sweep in frequency from f1 to f2 ($\Delta f$) that occurs over the time period Tm (modulation period). The graph shows the received signal on the same plot as a copy of the transmitter signal that is delayed by 2 R/c where c is the speed of light in the air interface which the signal propagates.

The equation in the lower right corner of the figure defines the relationship of the resultant beat frequency to the distance of the detected object as:

$$f_b = \text{beat frequency} = \frac{2R}{c}\frac{\Delta f}{T_m}$$

Figure 2:
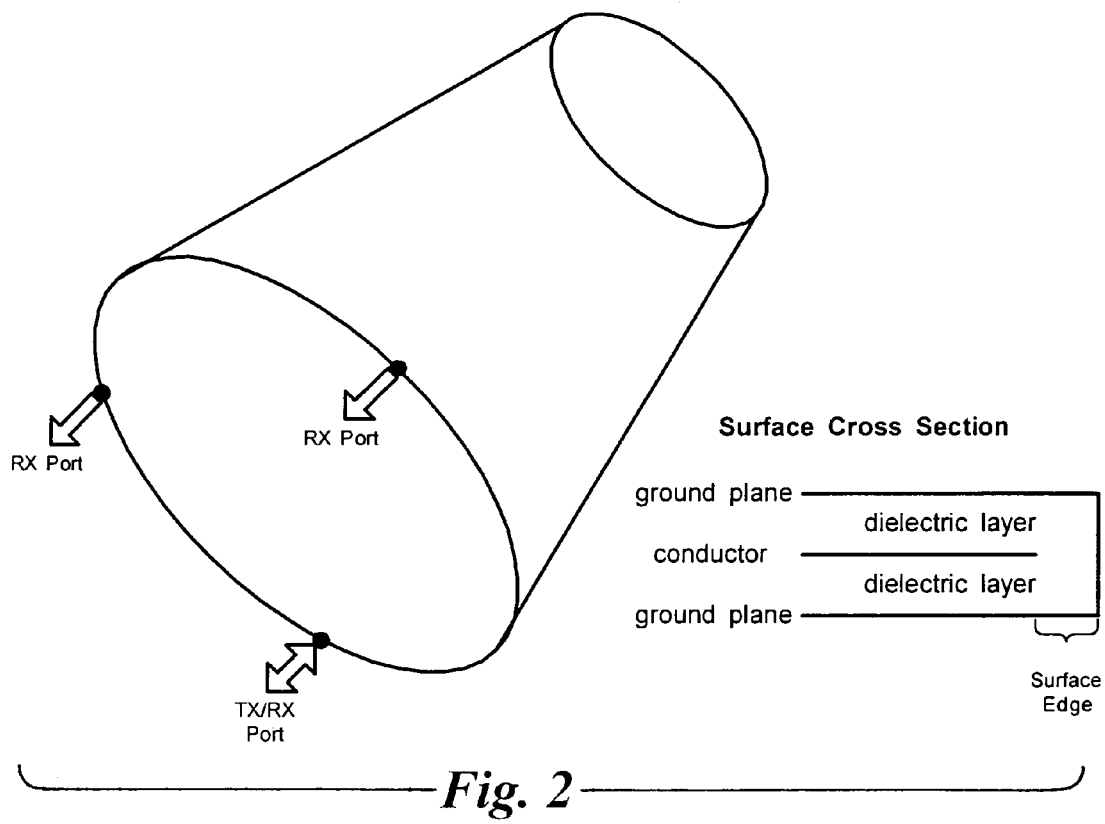
FIG. 2 is a schematic illustration of a physical configuration and a detection surface cross section that may be used to implement the FDR lethality system of the present invention.

FIG. 2 is a schematic illustration of a physical configuration and a detection surface cross section that may be used to implement the FDR lethality system of the present invention. At this point we will use the term "detection surface" to differentiate this type of construction from a "detection grid".

The diagram in upper right hand side of the figure shows the configuration of the detection surface cross section. The surface consists of an inner conductor in which the detection signals will propagate sandwiched between two dielectric layers. This layered assembly is encompassed by conductive ground planes which are connected at the surface edge. The material selection and thickness of the dielectric layers are critical to the surface design as they contribute to the frequency selectivity as well as the propagation velocity of signals in the surface.

The illustration on the left hand side of the figure shows a conical surface with a 3 port measurement configuration. One of the ports is designated as a transmit/receive port TX/RX and the other ports are designated as receive only ports RX. To measure the Frequency Domain Reflectometry (FDR) response of this surface, an interrogation signal is injected into the surface at the TX/RX port and measurements of reflected signals are captured at all ports. FDR lethality measurements for this system configuration are conducted as follows:

FDR response of an intact detection surface are measured as a baseline

Subsequent deltas measured from the baseline imply a detected fault

Figure 3:
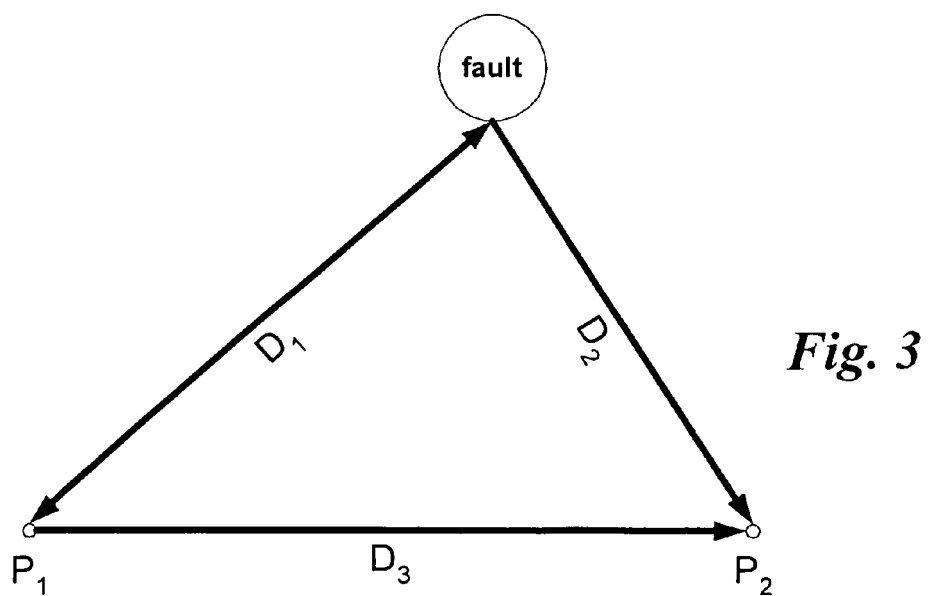
FIG. 3 is a schematic illustration of an example of fault detection in a scenario where a fault has occurred and the determination of distances to resolve the distance of the fault from both of the ports and triangulate the exact location of the fault in a surface.

Measurements from multiple ports are used to triangulate fault location on the detection surface FIG. 3 is a schematic illustration of an example of fault detection in a scenario where a fault has occurred and the determination of two distances D1 and D2 is necessary to resolve the distance of the fault from both the transmit/receive port (TX/RX) and the receive-only port(s) (RX) and triangulate the exact location of the fault in a surface. For the purpose of developing our measurement equations we will define the following:

P1—is the transmit/receive port
P2—is a receive-only port
c—is the speed of light in air
kp—is the propagation velocity constant (relative to air)
D3—is the known distance between the hardware geometry (distance between P1 and P2)

Based upon the relationship between received FDR beat frequencies and distance to reflective objects developed in FIG. 1 the following equations are presented:

$$D_1 = \frac{1}{2} f_{b1} \frac{T_m}{\Delta f} c k_p$$

D1 is dependent on fb1 which is a beat frequency resultant from an interrogation signal injected at P1 that reflects off of a fault and is received at P1:

$$D_2 = f_{b2} \frac{T_m}{\Delta f} c k_p - D_1$$

D2 is dependent on fb2 which is a beat frequency resultant from an interrogation signal injected at P1 that reflects off of a fault and is received at P2:

$$D_3 = f_{b3} \frac{T_m}{\Delta f} c k_p \Rightarrow k_p = \frac{D_3}{f_{b3}} \frac{\Delta f}{cT_m}$$

D3 is dependent on fb3 which is a beat frequency resultant from an interrogation signal injected at P1 that travels an unobstructed path and is received at P2. Since D3 is already known by geometry, the measurement of fb3 provides an added bonus of being able to precisely determine the value of kp.

By substituting the indirectly measured value of kp into the equations for D1 and D2 these relationships can be simplified to:

$$D_1 = \frac{1}{2} D_3 \frac{f_{b1}}{f_{b3}}$$

$$D_2 = D_3 \frac{f_{b2}}{f_{b3}} - D_1$$

Thus, we now have a relationship that defines the desired unknowns D1 and D2 in terms of measurable quantities fb1, fb2, and fb3.

Figure 4:
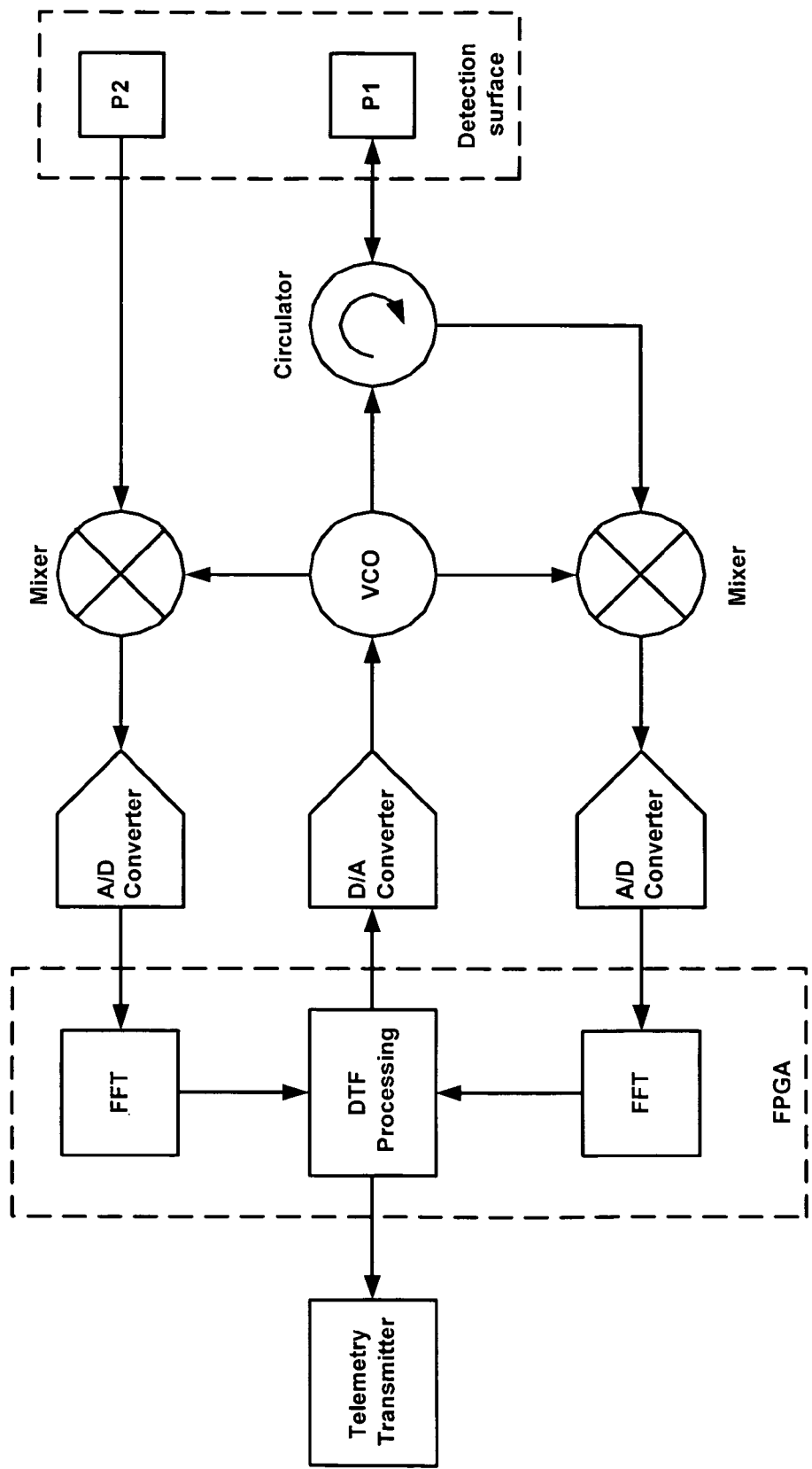
FIG. 4 is a high level functional block diagram of an example of the detection electronics for a two-port FDR system.

FIG. 4 is a high level functional block diagram of an example of the detection electronics for a two-port FDR system. It should be understood that this system can easily be expanded to increase the number of detection ports by replication of the receive-only (P2) channel circuitry.

There are four main electronics sections to this system that are detailed below:

1. Detection Surface

A detection surface constructed as described above has RF connectors (P1 and P2) for making FDR measurements of the surface.

2. Analog Electronics

The analog electronics perform the following functions:

Interrogation signal generation—A voltage controlled oscillator (VCO) provides the linear frequency swept transmit signal by using a digital to analog converter (DAC) to precisely drive its control voltage. The output of the VCO is injected into the detection surface at the TX/RX port and is also used as the reference signal for the receive mixers.

Receive mixing—Signals received from the ports on the detection surface are mixed with the transmitted signal to generate beat frequencies when faults occur in the detection surface.

Analog to digital conversion—Analog to digital converters (ADC's) sample the mixer outputs to allow the frequency domain signal processing to occur digitally.

3. Distance to Fault (DTF) Processing

The DTF processing is a completely digital operation in which the frequency response of all ports would be measured by Fourier analysis to detect beat frequencies that occur as a result of faults in the surface. The frequency measurements are then compared to prior baseline measurements to detect the existence of newly measured faults and compute the distances to those faults from the individual ports. The distance vectors would then be encoded for telemetry transmission and passed to the transmitter. This DTF processing would be implemented in high speed programmable logic devices such as Field Programmable Gate Arrays (FPGA).

4. Telemetry Transmitter

The telemetry transmitter is used to wirelessly transmit the lethality data to a central receiver location for further processing and event reconstruction.

Overlaying the functionality of the FDR system with the application requirements provides a set of basic hardware requirements that must be met for the FDR system. The availability of commercial electronics components that meet these hardware requirements is a critical driver in the feasibility of designing and implementing a useable FDR system that meets the application requirements of lethality detection. The following statements identify some basic requirements for critical system components that must be satisfied and provide some data on commercially available products:

The FFT Engine (FPGA) must execute FFT's within the pulse period (Tm). An FFT IP core, commercially available from Xilinx, Inc., 2100 Logic Drive, San Jose, Calif. 95124 can perform a 256 point FFT in 256 clock cycles. At 500 MHz clock frequency on a Virtex-5 FPGA, also commercially available from Xilinx, Inc., the execution time is 512 ns. Custom FFT IP cores from other vendors claim faster execution rates.

The voltage controlled oscillator must sweep through a broad bandwidth>2 GHz within the pulse period (Tm). Commercially available VCO's form various vendors advertise 5 GHz output bandwidth with tuning port bandwidth of up to 30 MHz=>Tm=33 ns.

The analog to digital converters must sample fast enough to capture beat frequencies corresponding to the entire range of fault distances desired to detect the sample rate is dependent on surface size, pulse bandwidth ($\Delta f$), and pulse period (Tm).

Figure 5:
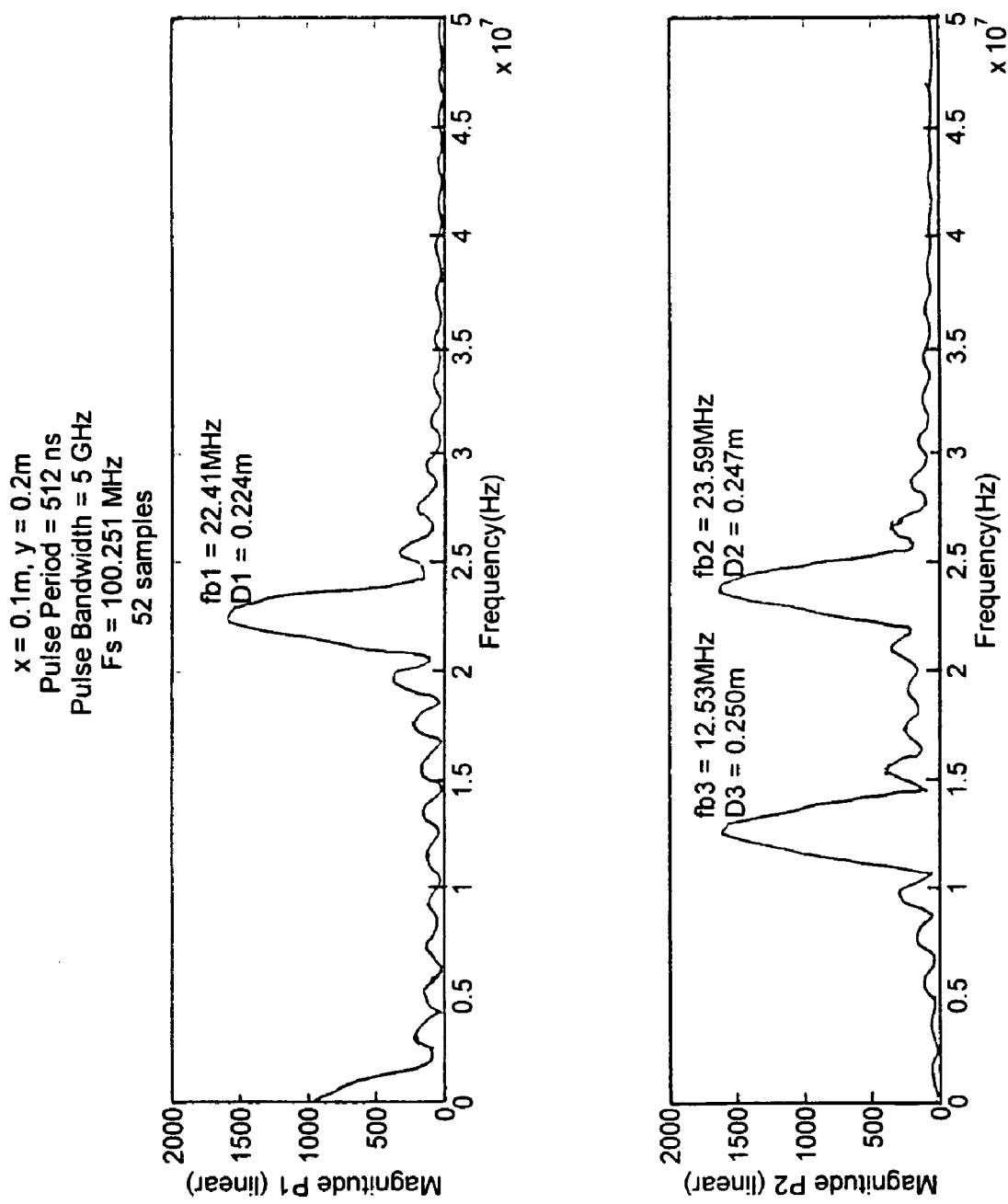
FIG. 5 is a graph illustrating a MATLAB™ simulation example that combines the hardware requirements with the equations developed and described herein to theoretically validate the fault triangulation technique using parameters that are achievable with commercially available electronic components. MATLAB™ is a commercially available software program product for mathematical computing and graphing produced by The Math Works, Inc., 24 Prime Park Way, Natick, Mass., 01760.

FIG. 5 is a graph illustrating a MATLAB™ simulation example that combines the hardware requirements described above with the equations developed in FIG. 3 to theoretically validate the fault triangulation technique using parameters that are achievable with commercially available electronic components. MATLAB™ is a trademark denoting a commercially available software program product for mathematical computing and graphing produced by The Math Works, Inc., 24 Prime Park Way, Natick, Mass., 01760. The limiting parameters to the simulation are as follows:

The (X,Y) coordinates are relative to P1. The detection surface is modeled as an infinite plane with 2 ports P1 and P2 separated by a distance D3 on the X axis. The distance between ports is set at 0.25 m. Sample rate is determined by the maximum fault distance desired to detect 0.5 m using a given Pulse Period (512 ns) and bandwidth (5 GHz). 0.5 m was selected to model a realistic detection surface. A 512 ns pulse period is driven by the FFT engine performance as identified above. A 5 GHz bandwidth is driven by the VCO performance as identified above. The simulation performs the following steps:

1. Create a swept input pulse and sum appropriately delayed versions of the pulse to simulate reflections in receive signals at each port
2. Mix the simulated receive signals with the transmit signal
3. Calculate distances D1, D2, and D3 using resultant beat frequencies The plots in the graphs on the left hand side of the figure show the resultant frequency response measurements that occur from a fault placed at (0.1 m, 0.2 m).

1. The minimum required sample rate turns out to be 100.251 Mhz
2. The upper plot is the P1 response which contains a beat frequency fb1=22.41 MHz corresponding to a distance D1=0.224 m
3. The lower plot is the P2 response which contains 2 beat frequencies fb2=23.59 MHz and fb3=12.53 MHz corresponding to D2=0.247 m and D3=0.250 m Although the present Frequency Domain Reflectometry (FDR) lethality assessment method and system has been described with respect to a particular application, for purposes of example only, it should be understood that the present method and system may also be used in a wide variety of other applications involving surface breach detection. For example, the present method and system may be used to detect breach of surfaces in missile bodies, aircraft, ships, submarines, spacecraft, and fuel tanks, to name a few.

Other potential applications include monitoring a surface that may have periodic or aperiodic changes in shape or material characteristics that could be measured using FDR, such as surface monitoring to measure changing propagation velocity related to material fatigue or deformation, and measuring changes in surface response to indicate severity and location of surface corrosion.

Applications other than lethality assessment may impart a different hardware requirements other than those described above, but most applications would in fact have less rigorous real time processing requirements than impact lethality assessment.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A system for determining impact point and damage propagation faults in a detection surface utilizing frequency domain reflectometry (FDR), comprising:
   a detection surface having a conductive layer capable of propagating radio frequency (RF) signals;
   at least one signal transmit/receive port on said detection surface for injecting a radio frequency (RF) interrogation signal into said detection surface and at least two signal receive-only ports on said detection surface spaced a distance apart from each other and from said signal transmit/receive port for receiving reflected radio frequency (RF) signals of said injected interrogation signal; and
   frequency domain reflectometry measurement means coupled with said transmit/receive port and said at least two signal receive-only ports operational to measure frequency responses of said ports compared to predetermined baseline measurements and determine a precise location of an impact point and damage propagation fault in said detection surface by triangulation.

2. The system according to claim 1, further comprising:
   a voltage controlled oscillator coupled with said frequency domain reflectometry measurement means driven by a digital to analog converter for providing a linear frequency swept interrogation signal, the output of which is injected into said detection surface at said at least one signal transmit/receive port and is also used as a reference signal wherein a delay in time of a resultant received reflected signal is proportional to the range that the signal has traveled through an intact detection surface and a baseline beat frequency is generated that is proportional to the magnitude of said range;
   signal mixer means connected with said voltage controlled oscillator and with said at least one signal transmit/receive port and said at least two signal receive-only ports for mixing signals received from said ports with said reference signal to generate beat frequencies when faults occur in said detection surface;
   analog to digital converters connected with said signal mixer means for sampling the output of said signal mixer means to allow frequency domain signal processing to occur digitally; and
   high-speed programmable distance to fault digital processor means connected with said analog to digital converters for measuring and analyzing the frequency response of all said ports to detect beat frequencies that occur as a result of faults in said detection surface and compare the frequency measurements to said baseline beat frequency to detect the existence of newly measured faults, compute distance vectors to those faults from the individual ports, and encode the data representing the distance vectors to the faults.

3. The system according to claim 2, further comprising:
   telemetry transmitter means connected with said digital processor means for transmitting the data representing the distance vectors to the faults to a remote receiver for further processing and event reconstruction.

4. The system according to claim 1, wherein
   said detection surface comprises an inner conductor layer sandwiched between two dielectric layers with conductive ground planes connected at an edge of said detection surface, and said radio frequency (RF) interrogation signal and said reflected radio frequency (RF) signals of said injected interrogation signal are propagated in said inner conductor layer.

* * * * *